(12) United States Patent
Nishikawa et al.

(10) Patent No.: US 6,399,905 B1
(45) Date of Patent: Jun. 4, 2002

(54) LEVER SWITCH AND COMPLEX SWITCH USING THE SAME

(75) Inventors: Hisashi Nishikawa, Shiga; Yoshiyuki Nakade, Fukui, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/615,598

(22) Filed: Jul. 13, 2000

(30) Foreign Application Priority Data

Jul. 14, 1999 (JP) .......................................... 11-200108

(51) Int. Cl.$^7$ ................................................. H01H 9/00
(52) U.S. Cl. .................................................... 200/61.54
(58) Field of Search ....................... 200/7, 17 R, 61.27, 200/61.3, 61.35, 61.54, 332, 335

(56) References Cited

U.S. PATENT DOCUMENTS

| | | | |
|---|---|---|---|
| 4,803,316 A | 2/1989 | Hayasahi et al. ............ 200/406 |
| 5,191,178 A | 3/1993 | Baker ....................... 200/61.88 |
| 5,661,276 A * | 8/1997 | Shibata ..................... 200/61.54 |
| 5,742,013 A | 4/1998 | Myojin et al. ............... 200/6 R |
| 5,920,047 A | 7/1999 | Akimoto et al. ......... 200/61.54 |
| 6,103,980 A * | 8/2000 | Gauthier ................... 200/61.27 |
| 6,172,311 B1 * | 1/2001 | Hayashi .................... 200/61.27 |

* cited by examiner

Primary Examiner—Michael Friedhofer
(74) Attorney, Agent, or Firm—Wenderoth, Lind & Ponack, L.L.P.

(57) ABSTRACT

At the lower side of a contact piece holder moving parallel in plural directions by manipulation of an operation lever, a middle part of a cross contact piece 21 having plural contacts at different positions in the longitudinal direction of arms extended in four directions is held, and by changing over plural fixed contacts of a switch board by this contact piece, the small current and medium current can be changed over by one contact piece only, so that a lever switch small in the number of parts and easy to assemble is obtained.

26 Claims, 10 Drawing Sheets

LEVER SWITCH AND COMPLEX SWITCH USING THE SAME

FIELD OF THE INVENTION

The present invention relates to a lever switch for vehicle installed near a steering wheel of an automobile, and a complex switch using the same.

BACKGROUND OF THE INVENTION

A lever switch for vehicle is mainly used for changing over the functions of
1) headlight,
2) turn signal for direction indication,
3) wiper motor for operating the wiper of windshield or rear window, and
4) washer motor for ejecting washer liquid to the windowpane.

Each contact of the lever switch is connected to an electronic control circuit of the vehicle mounting a microcomputer for controlling them. The contacts of the lever switch are directly connected to the microcomputer. However, considering the possibility of malfunction of the microcomputer, the contacts for changing over the HI operation of the wiper motor and the headlight are also connected to the individual relays for driving them.

In such conventional lever switch, an example of use in changeover of washer motor and wiper motor is explained by referring to FIG. 7 to FIG. 10.

Figure 7:
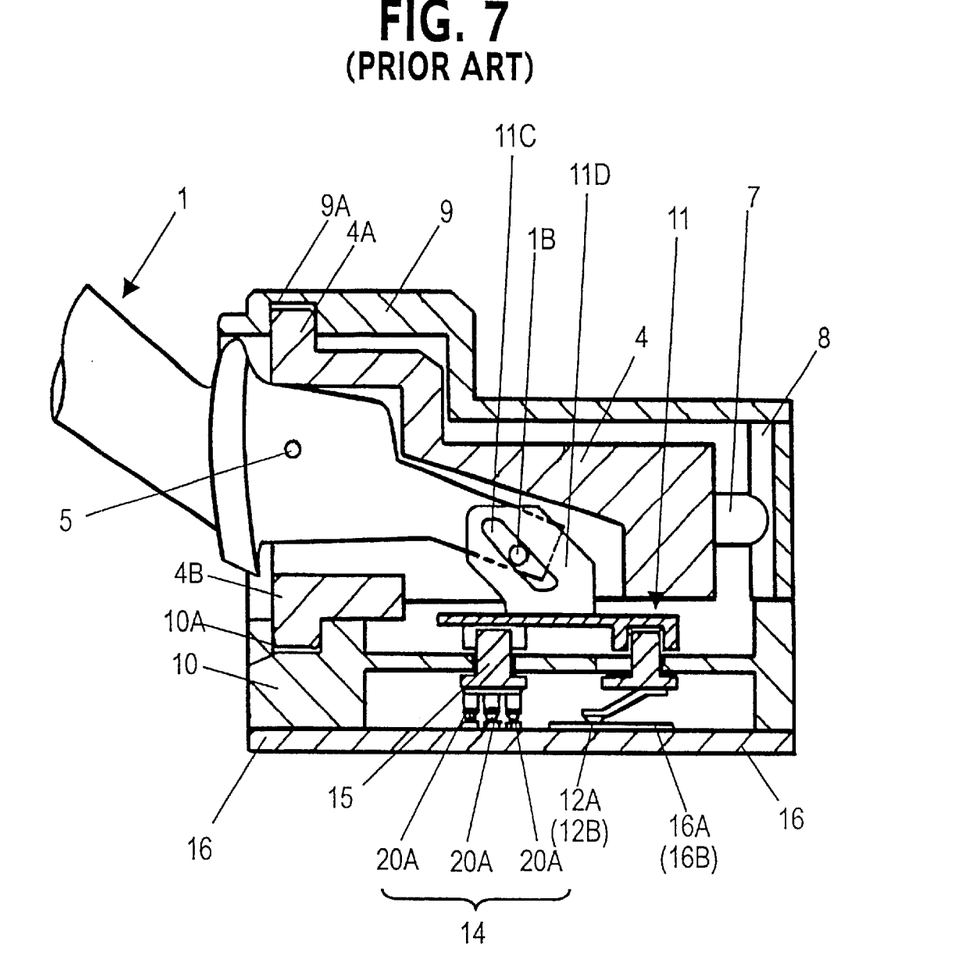
FIG. 7 is an essential sectional view of a conventional lever switch.
Figure 8:
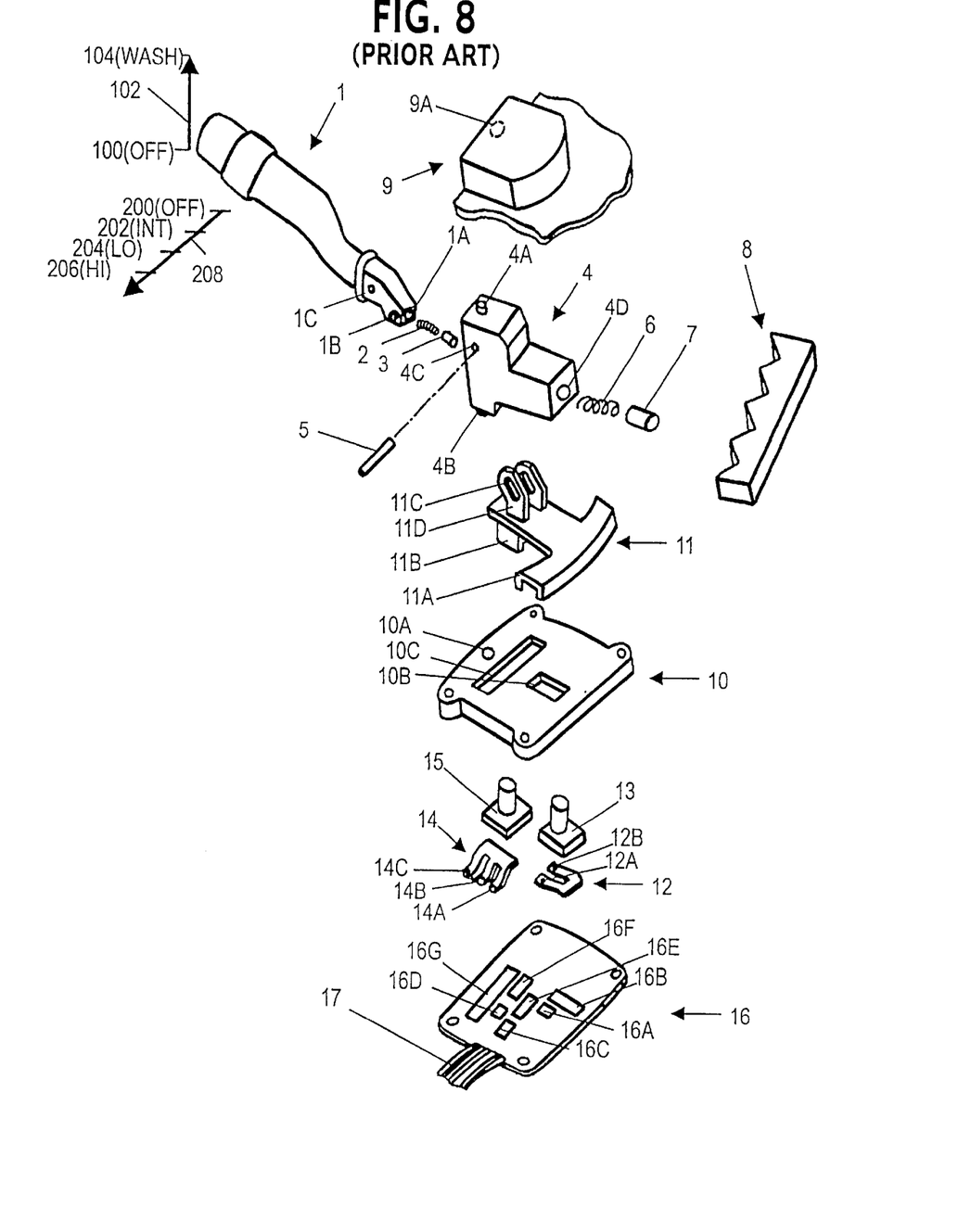
FIG. 8 is a perspective exploded view of a conventional lever switch.

FIG. 7 is an essential sectional view of a conventional lever switch, and FIG. 8 is its perspective exploded view. As shown in FIG. 8, a coil spring 2 and a pin 3 are inserted into an engaging hole 1A formed at the front side of a first end of an operation lever (OL) 1. Further, a cylindrical bump 1B and a through-hole 1C are provided at both sides of the first end.

The OL 1 is mounted on a slider 4 so as to be rotatable in the vertical direction. For this mounting, a shaft 5 is inserted into the through-hole 1C of the OL 1 and a through-hole 4C of the slider 4. The position of the OL 1 in the longitudinal direction is determined as a pin 7 inserted into an engaging hole 4D of the slider 4 together with a coil spring 6 presses a detent plate 8.

A case 9 having a support hole 9A is disposed above the slider 4, and a cover 10 having a support hole 10A, and guide holes 10B, 10C is disposed beneath the slider 4. A shaft 4A projecting to the upper side and a shaft 4B projecting to the lower side of the slider 4 are fitted respectively to the support hole 9A and support hole 10A. By this fitting, the slider 4 is held so as to be rotatable in the longitudinal direction.

A contact piece holder 11 is disposed between the slider 4 and the cover 10. Two holding parts 11A and 11B are formed at the lower side of the contact piece holder 11, and a pair of arms 11D having slant holes 11C are provided at the upper side. As shown in FIG. 7, the arm 11D is contained inside the slider 4, and the bump 1B of the OL 1 is inserted into the slant hole 11C.

At the lower side of the holding part 11A of the contact piece holder 11, a columnar part of a slider 13 holding a cantilever type contact piece 12 is fitted. At the lower side of the holding part 11B, a columnar part of a slider 15 holding a cantilever type contact piece 14 is fitted. Further, contacts 12A, 12B of the contact piece 12 are composed to contact with fixed contacts 16A, 16B for changing over the washer motors formed on a switch substrate 16. Contacts 14A, 14B, 14C of the contact piece 14 are composed to contact with fixed contacts 16C, 16D, 16E, 16F, 16G for changing over the wiper motors formed on the same switch substrate 16. These fixed contacts are connected to the electronic control circuit (not shown) of the vehicle through lead wires 17.

In this configuration, the OL 1 can be manipulated in both vertical direction and longitudinal direction as shown in FIG. 8. FIG. 8 shows an example of operation of the OL 1. For example, when the second end of the OL 1 is manipulated in the vertical direction, the washer motor is turned on and off, and when the second end of the OL 1 is manipulated in the longitudinal direction, the wiper moves according to the manipulation position of the OL 1.

First, when manipulating the OL 1 from the OFF position 100 to the WASH position 104 in the direction of arrow 102 (upward direction), the action of each part until the washer motor is turned on is explained below.

Figure 9A:
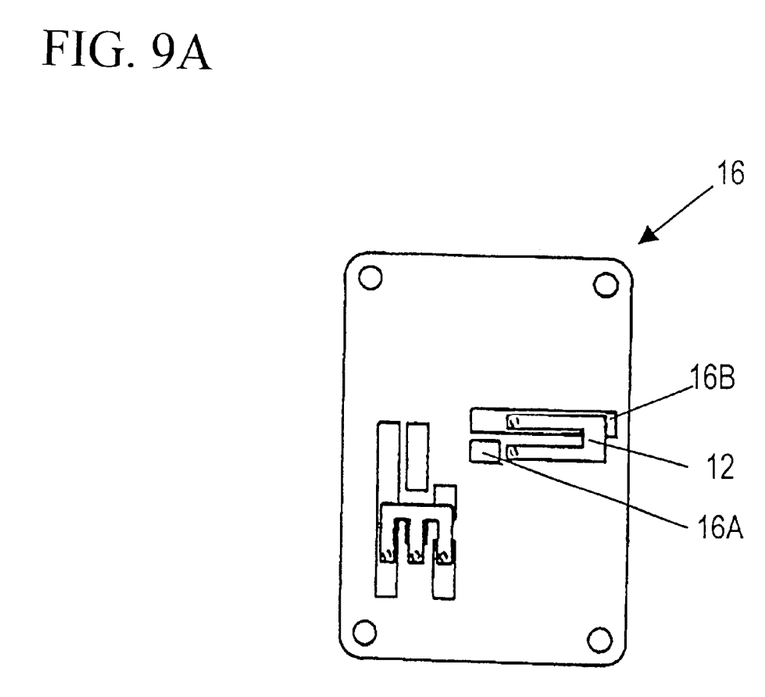
FIGS. 9A and 9B are contact piece layout diagrams showing the vertical direction operation of the conventional lever switch.
Figure 9B:
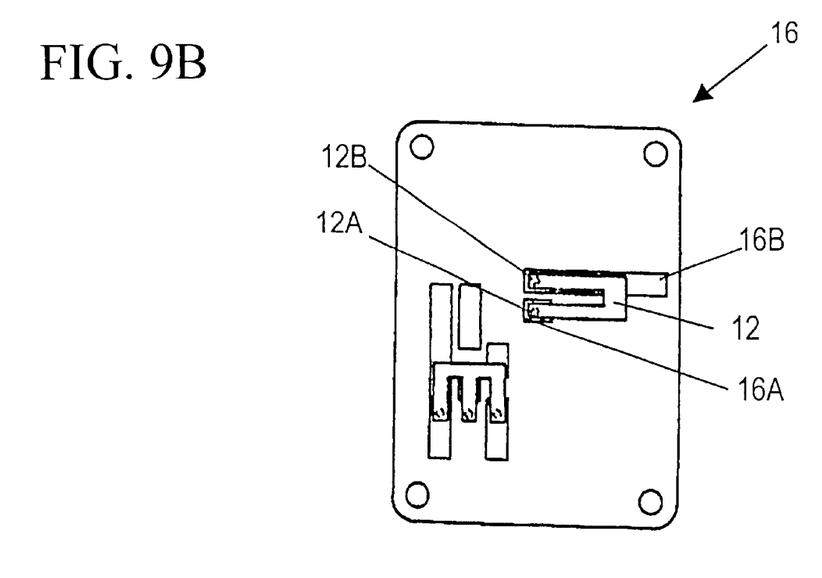

When the OL 1 is manipulated from the OFF position 100 to the WASH position 104 in the direction of arrow 102,
1) The bump 1B of the OL 1 swings in the lower direction around the shaft 5 as a fulcrum of the OL 1,
2) The contact piece holder 11 having the bump 1B into the slant hole 11C moves in the left direction,
3) The slider 13 fitted to the lower side of the holder 11 also moves in the left direction as the columnar part of the slider 13 is guided into the guide hole 10B of the cover 10,
4) The contact piece 12 held at the lower side of the slider 13 moves from the position shown in the layout diagram of the contact piece in FIG. 9A to the position shown in FIG. 9B,
5) The contacts 12A, 12B contact with the fixed contacts 16A, 16B,
6) The fixed contact 16A and fixed contact 16B conduct with each other through the contact piece 12, and
7) The washer motor is turned on by this conduction.

Next, an example of manipulating the second end of the OL 1 in the longitudinal direction is explained below. When the OL 1 is moved from the OFF position 200 to the INT position 202, the wiper operates intermittently. When the OL 1 is moved to the LO position 204, the wiper operates at low speed, and when moved to the HI position 206, the wiper operates at high speed. The operation of the wiper by moving the OL 1 to each position is explained below.

Figure 10A:
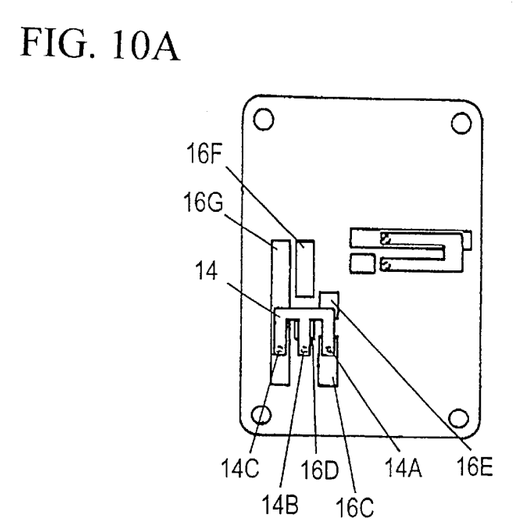
FIGS. 10A, 10B, 10C and 10D are contact piece layout diagrams showing the longitudinal direction operation of the conventional lever switch.
Figure 10B:
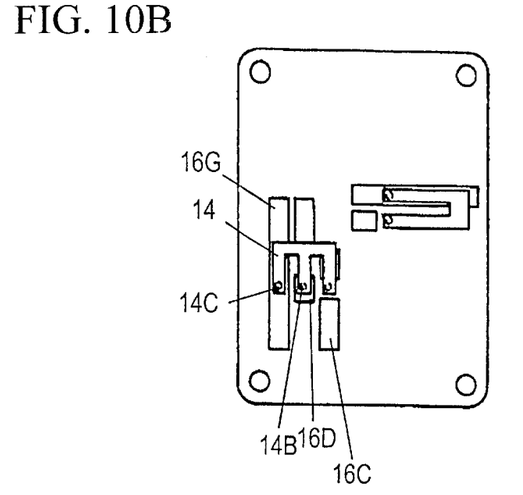

When the second end of the OL 1 is moved from the OFF position 200 in the direction of arrow 208 (forward direction),
1) The slider 4 swings in the rear direction around the shafts 4A, 4B held by the support hole 9A of the case 9 and the support hole 10A of the cover 10,
2) The contact piece holder 11 inserting and holding the slider 4 also moves in the rear direction, and the slider 15 fitted to its lower side moves the columnar part in the rear direction as being guided by the guide hole 10C of the cover 10,
3) The contact piece 14 held at the lower side of the slider 15 moves from the position shown in the contact piece layout in FIG. 10A to the position shown in FIG. 10B,
4) The contacts 14B, 14C contact with the fixed contacts 16D, 16G,
5) The fixed contact 16D and fixed contact 16G conduct through the contact piece 14, and
6) The wiper motor is changed over to the INT mode by this conduction.

Figure 10C:
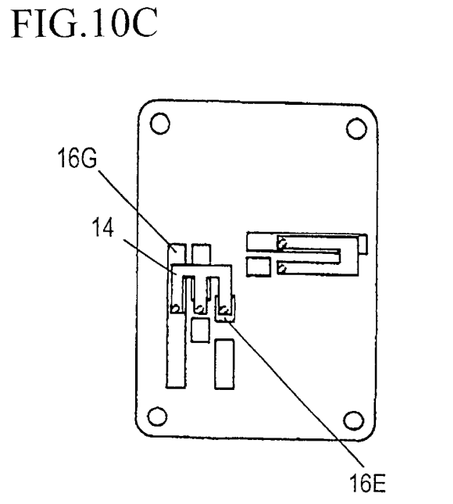
Figure 10D:
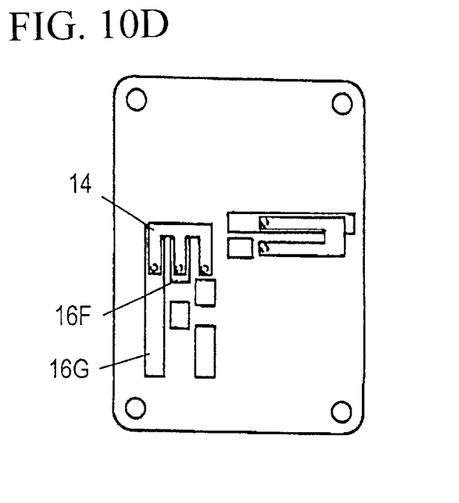

When the OL 1 is further manipulated in the forward direction,

7) At the LO position 204 shown in FIG. 10C, the fixed contact 16E and fixed contact 16G conduct through the contact piece 14, 8) At the HI position 206 shown in FIG. 10D, the fixed contact 16F and fixed contact 16G conduct through the contact piece 14, and 9) The wiper motor is changed over at each position by this conduction.

The current flowing at the time of manipulation of washer motor and wiper motor is explained below.

The current changed over by the contact piece 12 for manipulating the washer motor is a micro-current region of about several mA for operating the microcomputer. Accordingly, the thickness of the contact piece 12 may be thin. The contacting pressure of the contact piece 12 and fixed contact may be set small because the current is small. However, in order to operate the wiper motor, the current to be changed over by the contact piece 14 is the sum of the operating current of the microcomputer and the current flowing in the relay for operating and driving the wiper motor. The total current is turned on and off by the contact piece 14 and the fixed contact for operation of the wiper motor. When turning on and off the current, arc discharge takes place between the contact piece 14 and fixed contact. When an arc is generated, the contact portions of the contact piece 14 and fixed contact are consumed. The current generating the arc at the on/off time is called medium current herein. Therefore, in order to withstand this medium current, the material of the contact piece 14 must be thick enough, and the contact pressure of the contact piece 14 and fixed contact must be also set higher.

In the conventional lever switch, however, aside from the contact piece 12 for changing over the small current of the microcomputer, the contact piece 14 differing in the plate thickness and contact pressure for changing over the medium current of the relay are also required. Hitherto, therefore, the contact piece 12 and contact piece 14 were different ones. As a result, the number of parts for composing the lever switch is large and the structure of the lever switch is complicated.

SUMMARY OF THE INVENTION

The present invention solves the problems of the prior art, and it is hence an object thereof to present a lever switch capable of changing over the small current and medium current by one contact piece, small in the number of parts, and easy to assemble, and a complex switch using the same.

The lever switch of the present invention comprises:

a. an operation lever to be manipulated in plural directions, b. a contact piece holder moving parallel in plural directions by the manipulation of this lever, c. a contact piece of a cross elastic metal thin plate held in the contact piece holder by fitting an engaging hole of its middle part with a protrusion at the lower side of the contact piece holder, and d. a switch board forming plural fixed contacts elastically contacting with each contact of the contact piece on the upper side.

In this configuration, the contact piece has at least a first contact and a second contact at different positions in the longitudinal direction of each one of arms extending in four directions.

The first contact and second contact formed on each arm are disposed at different positions in the longitudinal direction, and when changing over the medium current, the contact (first contact) contacting first with the fixed contact is consumed by arc discharge. However, the contact (second contact) contacting later with the fixed contact is not consumed because arc discharge does not take place. As a result, the contact between the second contact and the fixed contact is stable for long period. Therefore, the lever switch of the present invention can change over small current and medium current by one contact piece, and the number of parts is smaller and the assembling is easy.

DETAILED DESCRIPTION OF THE PREFERRED EMBODIMENTS

Concerning embodiments of the present invention, examples of use in changeover of washer motor and wiper motor are explained below by referring to FIG. 1 to FIG. 6.

Same parts as explained in the prior art are identified with same reference numerals, and detailed description is omitted.

Embodiment 1

Figure 1:
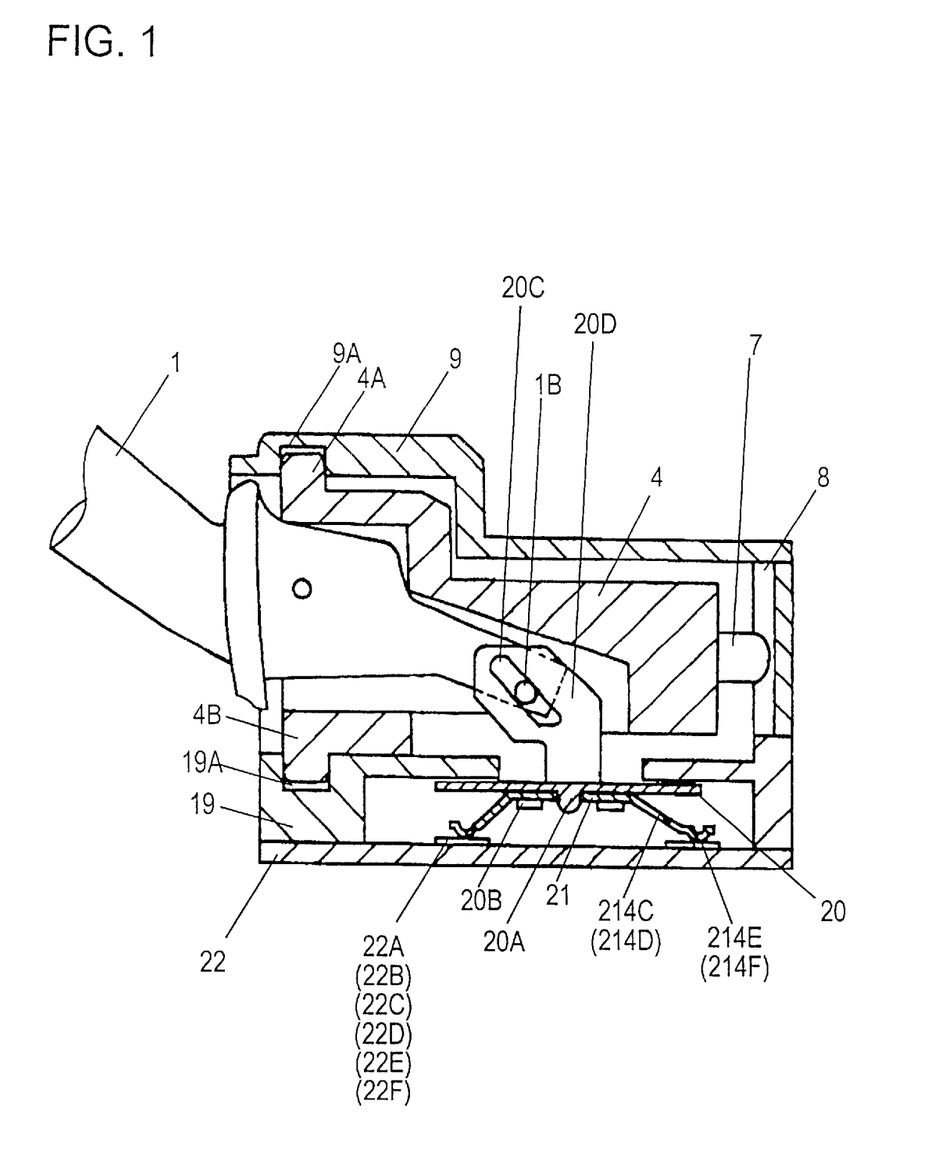
FIG. 1 is an essential sectional view of a lever switch in a first embodiment of the invention.
Figure 2:
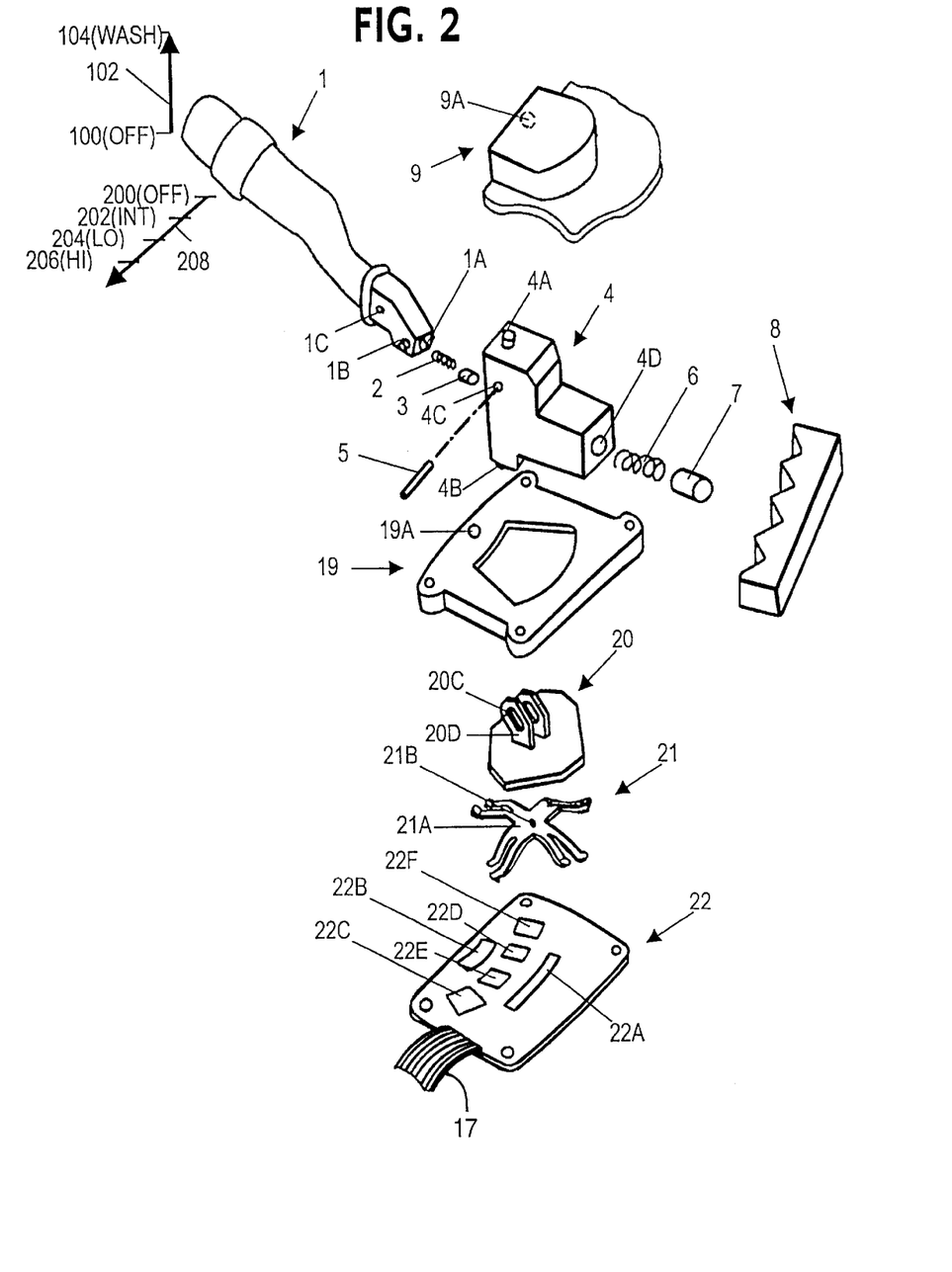
FIG. 2 is a perspective exploded view of a lever switch shown in FIG. 1.

In FIG. 1 and FIG. 2, the following structural points are same as in the prior art. That is, a. The coil spring 2 and pin 3 are inserted in the engaging hole 1A of the OL 1, b. The shaft 5 is inserted into the through-hole 1C of the OL 1 and the through-hole 4C of the of the slider 4 in order that the OL 1 may rotate about the slider 4 in the vertical direction, c. The pin 7 inserted into the engaging hole 4D at the front side of the slider 4 together with the coil spring 6 is pressed tightly to the restraint panel 8, d. The upper and lower shafts 4A, 4B of the slider 4 are fitted to the support hole 9A of the case 9 and the support hole 19A of the cover 19, e. By this fitting, the slider 4 is rotatably held in the longitudinal direction, and f. The cylindrical bump 1B of the OL 1 is inserted into the slant hole 20C of the pair of arms 20D formed on the upper side of the contact piece holder 20 disposed beneath the cover 19.

In embodiment 1 of the present invention, however, a protruding holding part 20A and a rib 20B are formed at the lower side of the contact piece holder 20.

Figure 3A:
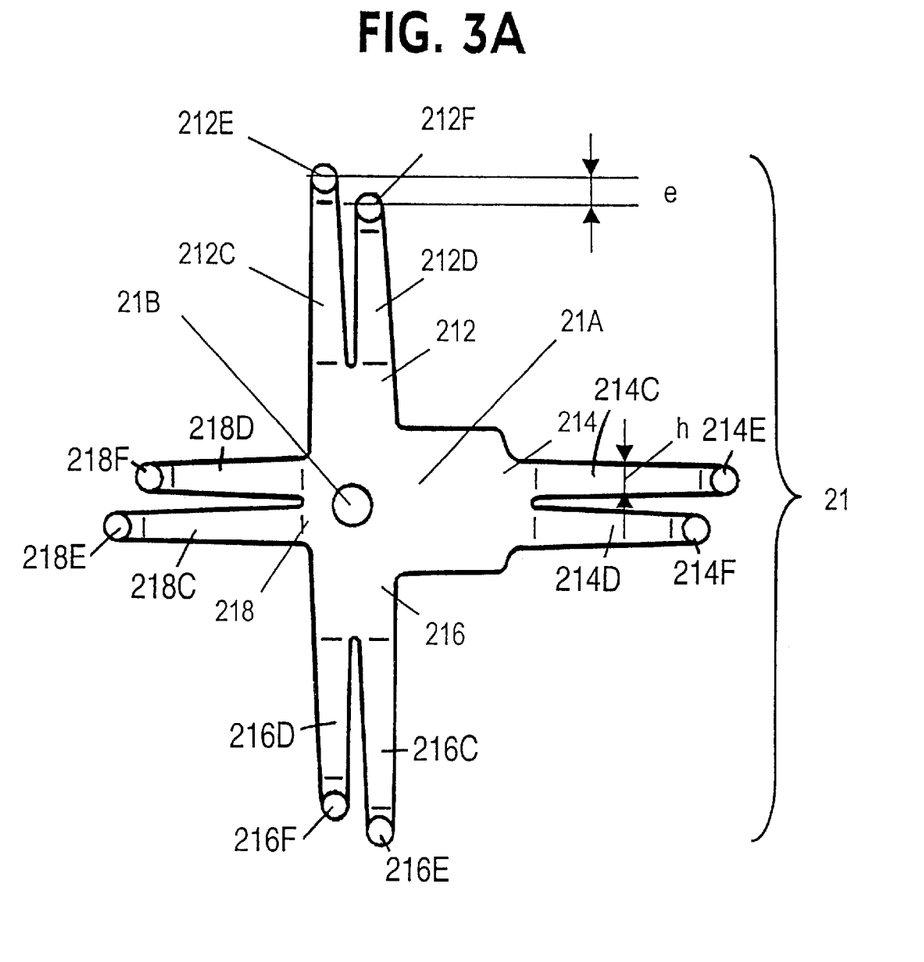
FIG. 3A is a plan of a contact piece of the lever switch shown in FIG. 1.
Figure 3B:
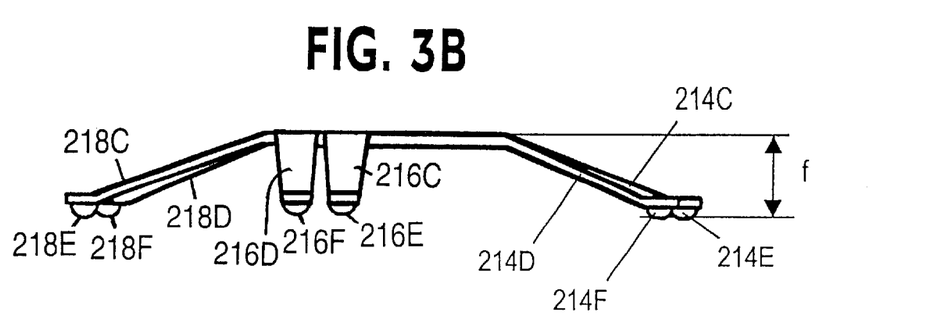
FIG. 3B is a side view of the contact piece shown in FIG. 3A.

Beneath the contact piece holder 20, there is a contact piece 21 of a cross elastic metal thin plate. The contact piece 21 is held in the contact piece holder 20 by fitting an engaging hole 21B of the middle part 21A with the protrusion at the lower side of the contact piece holder 20. The contact piece 21 is fixed and the contact piece 21 prevented from rotating by the rib 20B. FIG. 3A and FIG. 3B show the detailed shape of the contact piece 21. As shown in FIG. 3A and FIG. 3B, arms (212, 214, 216, 218) are extended in four directions from the middle part 21A. The arms extended in four directions are individually divided into two in the longitudinal direction. At the leading ends of each divided arm, contacts are provided. For example, a first contact 212E is attached to the leading end of the divided arm 212C of the arm 212, and a second contact 212F is attached to the leading end of the arm 212D.

At the upper side of the switch board 22, fixed contacts 22A, 22B, 22C, 22D, 22E, 22F are formed, corresponding to the contacts 212E, 212F of the contact piece 21. These fixed contacts are connected to the electronic control circuit (not shown) of the vehicle through lead wires 17.

In this configuration, the OL 1 can be manipulated in the vertical direction and lateral direction as shown in FIG. 2. FIG. 2 shows an example of manipulation of the OL 1. For example, when the OL 1 is manipulated in the vertical direction, the washer motor is turned on and off, or when the OL 1 is manipulated in the longitudinal direction, the wiper moves according to the manipulation position of the OL 1.

First, when the OL 1 is moved from the OFF position 100 in FIG. 2 to the WASH position 104 in the arrow direction 102 (upper direction), the motion of each part until the washer motor is turned on is explained below by referring to FIG. 1 and FIG. 2.

Figure 4A:
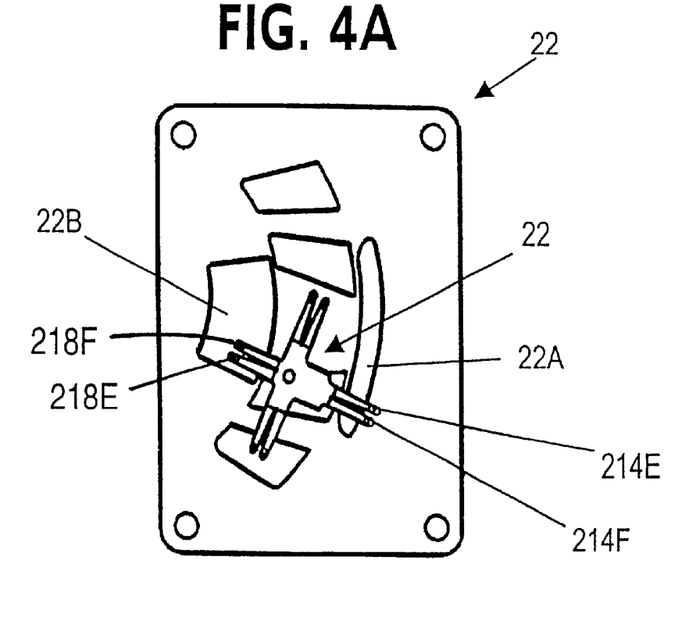
FIGS. 4A and 4B are contact piece layout diagrams showing the vertical direction operation of the lever switch shown in FIG. 1.

The configuration of the contact of the contact piece 21 and the fixed contact of the switch board 22 at the OFF position 100 of the OL 1 in the vertical direction in FIG. 2 is shown in FIG. 4A. In this state, the contacts (218E, 218F) of the arm 218 of the contact piece 21 are contacting with the fixed contact 22B of the switch board 22. The contacts (214E, 214F) of the arm 214 of the contact piece 21 are not contacting with the fixed contact 22A of the switch board 22.

Figure 4B:
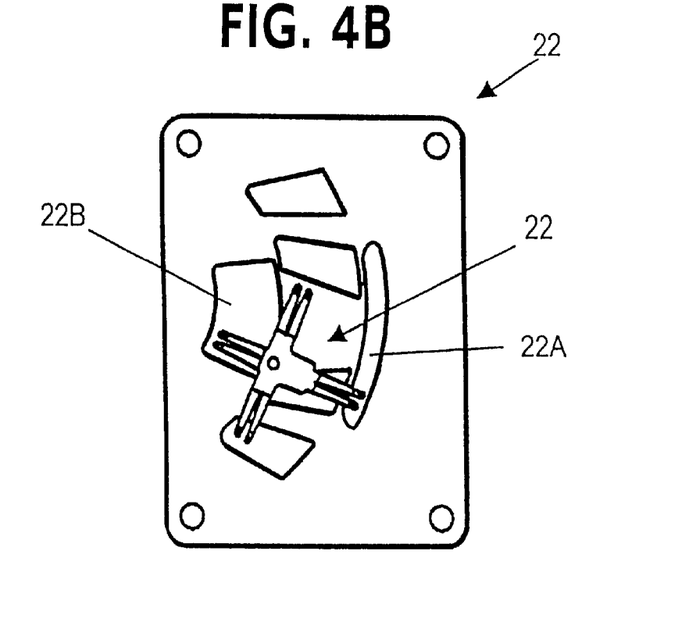

When the OL 1 is moved from the OFF position 100 to the WASH position 104 in the upper direction, 1) The bump 1B of the OL 1 rotates in the lower direction around the shaft 5 as a fulcrum,
2) The contact piece holder 20 having this bump 1B inserted in the slant hole 20C moves in the left direction,
3) The contact piece 21 held at the lower side of the contact piece holder 20 moves from the position shown in the contact piece layout in FIG. 4A to the position shown in FIG. 4B,
4) The contacts (214E, 214F) provided in the arm 214 contact with the fixed contact 22A,
5) The fixed contact 22A and fixed contact 22B conduct with each other through the contact piece 21, and
6) The washer motor is turned on by this conduction.

Next, manipulation of the OL 1 in the longitudinal direction is explained. When the OL 1 is moved from the OFF position 200 to the INT position 202, the wiper operates intermittently. When the OL 1 is moved to the LO position 204, the wiper operates at low speed, and when moved to the HI position 206, the wiper operates at high speed. Motion of the wiper by moving of the OL 1 to each position is explained.

Figure 5A:
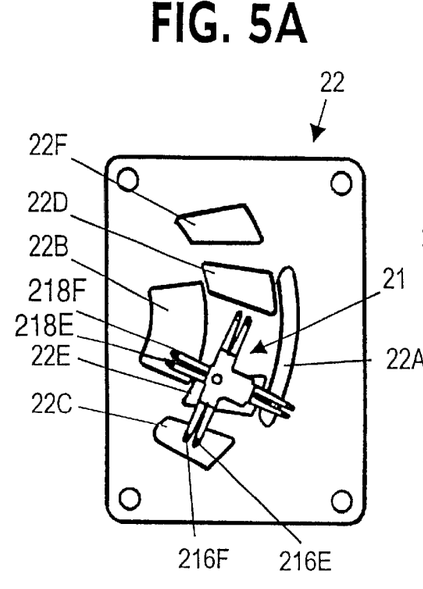
FIGS. 5A, 5B, 5C and 5D are contact piece layout diagrams showing the longitudinal direction operation of the lever switch shown in FIG. 1.

FIG. 5A shows the configuration of the contact of the contact piece 21 and the fixed contact of the switch board 22 at the OFF position 200 of the OL 1 in the longitudinal direction in FIG. 2. In this state, the contacts (218E, 218F) of the arm 218 of the contact piece 21 are contacting with the fixed contact 22B of the switch board 22. The contacts (216E, 216F) of the arm 216 of the contact piece 21 are contacting with the fixed contact 22C of the switch board 22.

Figure 5B:
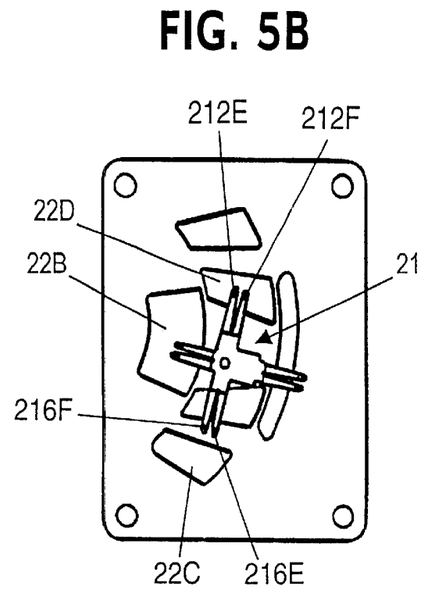

When the OL 1 is moved from the OFF position 200 to the INT position 202 in the arrow direction 208 (forward direction), 1) The slider 4 rotates in the rear direction around the shafts 4A, 4B held by the support hole 9A of the case 9 and the support hole 19A of the cover 19,
2) The contact piece holder 20 in which the slider 4 is inserted and held also moves in the rear direction,
3) The contact piece 21 held at the lower side of the contact piece holder 20 moves from the position shown in the contact piece layout in FIG. 5A to the position shown in FIG. 5B,
4) The contacts (212E, 212F) attached to the arm 212 contact with the fixed contact 22D, and the contacts (216E, 216F) of the arm 216 are cleared from the fixed contact 22C of the switch board 22,
5) The fixed contact 22B and fixed contact 22D conduct with each other through the contact piece 21, and
6) The wiper motor is changed over to INT mode by this conduction.

Figure 5C:
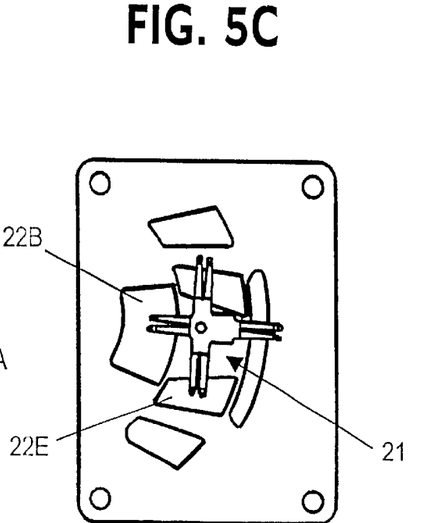
Figure 5D:
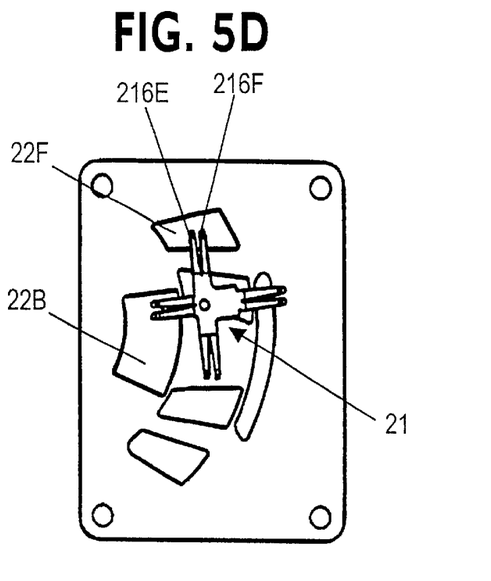

When the OL 1 is further manipulated in the forward direction,

7) At the LO position 204 shown in FIG. 5C, the fixed contact 22B and fixed contact 22E conduct with each other through the contact piece 21,
8) At the HI position 206 in FIG.SD, the fixed contact 22B and fixed contact 22F conduct with each other through the contact piece 21, and
9) The wiper motor is changed over at each position.

The flow of current during operation of the washer motor and wiper motor is explained below.

Thus, by the manipulation of the OL 1 in the vertical direction, a micro-current region of about several mA for washer motor is changed over. By the manipulation of the OL 1 in the longitudinal direction, the medium current generated by arc discharge for wiper motor is changed over. However, as shown in FIG. 3, for example, the length of the arms 212C, 212D of the contact piece 21 is changed. Therefore, the first contact 212E and second contact 212F are formed at positions differing in dimension by "e" in the longitudinal direction. Other arms are formed similarly. Accordingly, when changing over, for example, from the position shown in FIG. 5C to FIG. 5D, the first contact 212E contacts with the fixed contact 22F in the first place. Hence, an arc discharge is generated between the contact 212E and fixed contact 22F. By this arc discharge, the contact 212E is consumed. However, the second contact 212F contacts with the fixed contact 22F, later than the contacting of the contact 212E with the fixed contact 22F. Therefore, arc discharge is not generated between the contact 212F and fixed contact 22F. Hence, a stable contact is maintained between the contact 212F and fixed contact 22F.

In this example, the arm 212 is divided into two, 212C and 212D, in the longitudinal direction, but it may be also divided into three or more. In this case, the contact stability of the contact piece 21 and switch board is further enhanced.

When the arms 212C and 212D are same in width, and the contacts 212E and 212F to be attached to these leading ends are same in thickness, since the length of the arm 212D is short, the force of the contact 212F pushing the fixed contact is greater than the force of the contact 212E pushing the fixed contact. This configuration improves the stability of the contact between the contact piece 21 and the fixed contact.

Thus, according to the embodiment, the small current and medium current can be changed over by one contact piece. Therefore, the embodiment realizes the lever switch smaller in the number of parts and easier to assemble.

Moreover, in the lever switch of the embodiment, since plural contacts are formed integrally in each arm of the contact piece 21, the number of parts used in the switch is further curtailed, and the cost is reduced.

In the lever switch of the embodiment, the length is different in the divided arms (for example, 212C and 212D) of each divided arm of the contact piece 21. Contacts (for example, 212E, 212F) are provided at the leading ends of the arms different in length (for example, 212C, 212D). In this configuration, the contact pressure is different between the contact (for example, 212E) contacting firstly with the fixed contact and the contact (for example, 212F) contacting later with the fixed contact, so that contacting with the fixed contact is stable.

Further as shown in FIG. 3A and FIG. 3B, when the width "h" is different in the arms (for example, 212C and 212D) in the contact piece 21, the both contact pressures are different. When the bending height "f" in the fixed contact direction is different in contacts (for example, 212E and 212F), the both contact pressures are different. In this way, the contact pressure of the fixed contact of the contact piece 21 is variable by changing the width "h" or height "f" shown in FIG. 3A and FIG. 3B. That is, the arm can properly select the contact pressure of each arm depending on the current to be changed over. Thus, a stable contact between the contact piece 21 and fixed contact is obtained.

In the foregoing explanation, the contacts (for example, 212E, 212F) are integrally formed at the leading ends of the arms (for example, 212C, 212D) divided from the arms extended in four directions of the contact piece 21. But the embodiment may be also realized without dividing the arms, or fixing separate individual contacts to the leading ends of the arms by crimping or welding depending on the current to be changed over.

Embodiment 2

Figure 6:
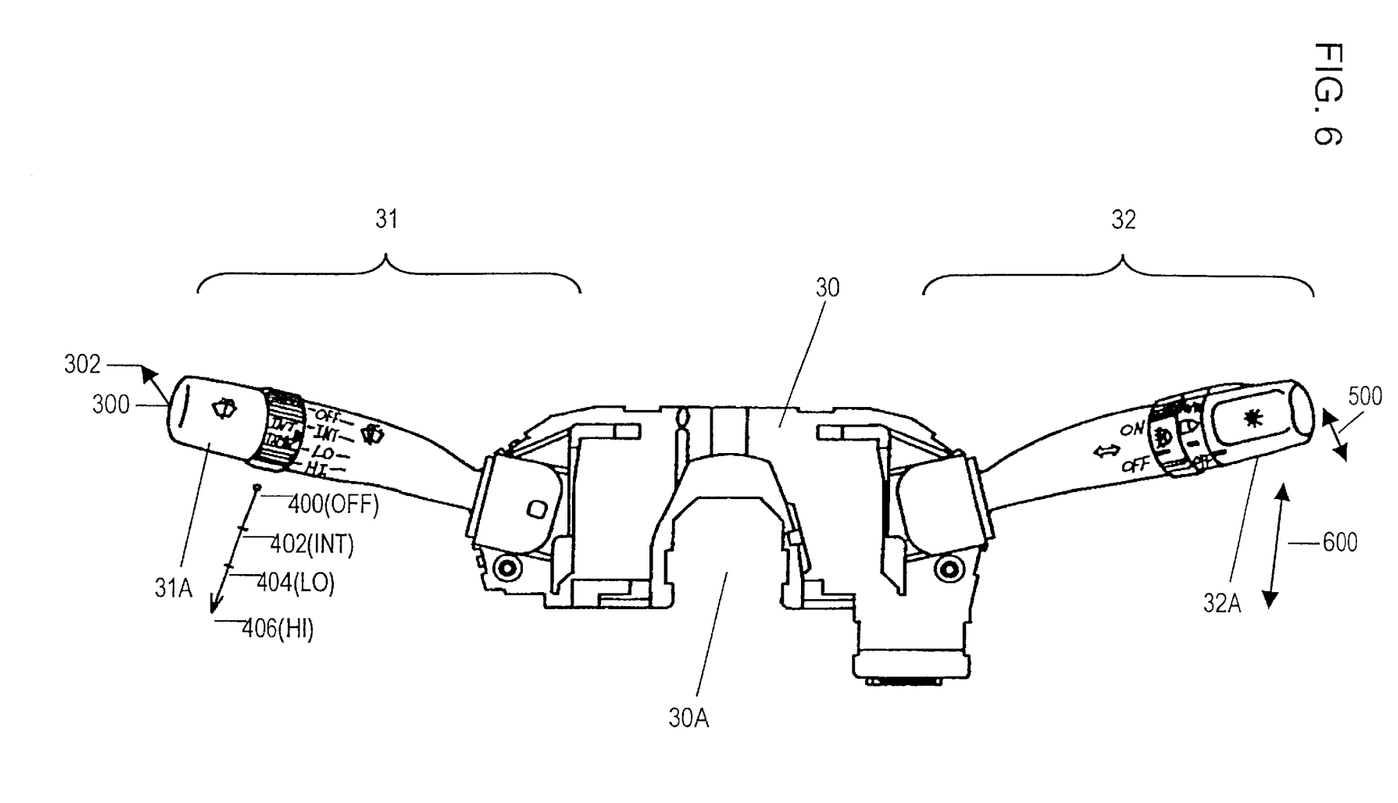
FIG. 6 is a plan of a complex switch in a second embodiment of the invention.

FIG. 6 is a plan of a complex switch according to embodiment 2 of the invention. In FIG. 6, the steering wheel of a vehicle is inserted in a central opening 30A of a mounting case 30. At the left side of the mounting case 30, a lever switch 31 for changing over the washer motor and wiper motor explained in embodiment 1 is provided, and at the right side, similarly, a lever switch 32 for changing over the headlight and turn signal is provided.

In this constitution, when a lever 31A of the lever switch 31 is manipulated in the longitudinal direction between OFF position 300 and WASH position 302, the washer motor is changed over. When the lever 31A of the lever switch 31 is manipulated in the vertical direction between OFF position 400, INT position 402, LO position 404 and HI position 406, the wiper motor is changed over in INT, LO and HI modes.

Similarly, when a lever 32A of the lever switch 32 is manipulated in the longitudinal direction 500, the quantity of light and illuminating position of the headlight can be changed over, or when manipulated in the vertical direction 600, the turn signal is lit up.

Thus, according to the embodiment, the lever switches 31, 32 explained in embodiment 1 are combined in a plurality in a radial direction about the center of rotation of the steering wheel of the vehicle, and a complex switch is composed. By using the lever switch explained in embodiment 1, the complex switch has multiple functions, and is small in the number of parts and is easy to assemble.

Thus, according to the present invention, the lever switch capable of changing over the small current and medium current by one contact piece only, small in the number of parts, and easy to assemble, and the complex switch using the same are obtained.

What is claimed is:

1. A lever switch comprising:
   an operation lever to be manipulated;
   a contact piece holder to move in response to manipulation of said operation lever;
   a contact piece to be held by said contact piece holder such that said contact piece and said contact piece holder move together upon manipulation of said operation lever, with said contact piece having at least one arm;
   a first contact and a second contact on said at least one arm, with said first contact being positioned along a longitudinal direction of said at least one arm a distance that is different from a distance that said second contact is positioned along the longitudinal direction of said at least one arm; and
   a switch board having at least one contact thereon which is to contact said first and second contacts,
   such that upon manipulation of said operation lever, said first contact on said at least one arm comes into contact with said at least one contact on said switch board and then said second contact on said at least one arm comes into contact with said at least one contact on said switch board.

2. The lever switch according to claim 1, wherein:
   said operation lever is to be manipulated in plural directions;
   said contact piece holder is to move, in response to manipulation of said operation lever, in plural directions that correspond to the plural directions in which said operation lever is to be manipulated;
   said contact piece holder includes a central portion, and said at least one arm comprises a first arm, a second arm, a third arm and a fourth arm extending from said central portion in four different directions such that said contact piece has a cross-shaped configuration;
   the distances that said first and second contacts are positioned along the longitudinal direction of said at least one arm correspond to distances measured from said central portion; and
   said at least one contact on said switch board comprises plural fixed contacts.

3. The lever switch according to claim 2, wherein said contact piece comprises a thin flexible metal plate such that said first and second contacts are to resiliently contact said plural fixed contacts.

4. The lever switch according to claim 3, wherein said first and second contacts are integral with said first, second, third and fourth arms.

5. The lever switch according to claim 3, wherein each of said first, second, third and fourth arms includes a slit that divides a respective one of said first, second, third and fourth arms into a first portion and a second portion, with said first and second contacts being positioned at end regions of said first and second portions, respectively.

6. The lever switch according to claim 5, wherein said first portion and said second portion of each of said first, second, third and fourth arms have widths that are different from one another.

7. The lever switch according to claim 5, wherein said first portion and said second portion of each of said first, second, third and fourth arms have heights that are different from one another, with the heights being measured perpendicularly from said central portion to planes containing said end regions, respectively.

8. The lever switch according to claim 3, wherein each of said first, second, third and fourth arms is divided along the longitudinal direction thereof to provide a first portion and a second portion having different lengths relative to each another, and wherein said first contact is positioned along a longitudinal direction of said at least one arm a distance that is different from a distance that said second contact is positioned along the longitudinal direction of said at least one arm by having said first contact be positioned on an end region of said first portion and said second contact be positioned on an end region of said second portion.

9. The lever switch according to claim 1, wherein said first and second contacts are integral with said at least one arm.

10. The lever switch according to claim 1, wherein said at least one arm includes a slit that divides said at least one arm into a first portion and a second portion, with said first and second contacts being positioned at end regions of said first and second portions, respectively.

11. The lever switch according to claim 10, wherein said first portion and said second portion of said at least one arm have widths that are different from one another.

12. The lever switch according to claim 10, wherein said first portion and said second portion of said at least one arm have heights that are different from one another.

13. The lever switch according to claim 1, wherein said at least one arm is divided along the longitudinal direction thereof to provide a first portion and a second portion having different lengths relative to each another, and wherein said first contact is positioned along a longitudinal direction of said at least one arm a distance that is different from a distance that said second contact is positioned along the longitudinal direction of said at least one arm by having said first contact be positioned on an end region of said first portion and said second contact be positioned on an end region of said second portion.

14. A complex switch having plural lever switches that are to be disposed generally radially from an axis of rotation of a steering wheel of a vehicle, with each of said plural lever switches comprising:
an operation lever to be manipulated;
a contact piece holder to move in response to manipulation of said operation lever;
a contact piece to be held by said contact piece holder such that said contact piece and said contact piece holder move together upon manipulation of said operation lever, with said contact piece having at least one arm;
a first contact and a second contact on said at least one arm, with said first contact being positioned along a longitudinal direction of said at least one arm a distance that is different from a distance that said second contact is positioned along the longitudinal direction of said at least one arm; and
a switch board having at least one contact thereon which is to contact said first and second contacts,
such that upon manipulation of said operation lever, said first contact on said at least one arm comes into contact with said at least one contact on said switch board and then said second contact on said at least one arm comes into contact with said at least one contact on said switch board.

15. The complex lever switch according to claim 14, wherein:
said operation lever is to be manipulated in plural directions;
said contact piece holder is to move, in response to manipulation of said operation lever, in plural directions that correspond to the plural directions in which said operation lever is to be manipulated;
said contact piece holder includes a central portion, and said at least one arm comprises a first arm, a second arm, a third arm and a fourth arm extending from said central portion in four different directions such that said contact piece has a cross-shaped configuration;
the distances that said first and second contacts are positioned along the longitudinal direction of said at least one arm correspond to distances measured from said central portion; and
said at least one contact on said switch board comprises plural fixed contacts.

16. The complex lever switch according to claim 15, wherein said contact piece comprises a thin flexible metal plate such that said first and second contacts are to resiliently contact said plural fixed contacts.

17. The complex lever switch according to claim 16, wherein said first and second contacts are integral with said first, second, third and fourth arms.

18. The complex lever switch according to claim 16, wherein each of said first, second, third and fourth arms includes a slit that divides a respective one of said first, second, third and fourth arms into a first portion and a second portion, with said first and second contacts being positioned at end regions of said first and second portions, respectively.

19. The complex lever switch according to claim 18, wherein said first portion and said second portion of each of said first, second, third and fourth arms have widths that are different from one another.

20. The complex lever switch according to claim 18, wherein said first portion and said second portion of each of said first, second, third and fourth arms have heights that are different from one another, with the heights being measured perpendicularly from said central portion to planes containing said end regions, respectively.

21. The complex lever switch according to claim 16, wherein each of said first, second, third and fourth arms is divided along the longitudinal direction thereof to provide a first portion and a second portion having different lengths relative to each another, and wherein said first contact is positioned along a longitudinal direction of said at least one arm a distance that is different from a distance that said second contact is positioned along the longitudinal direction of said at least one arm by having said first contact be positioned on an end region of said first portion and said second contact be positioned on an end region of said second portion.

22. The complex lever switch according to claim 14, wherein said first and second contacts are integral with said at least one arm.

23. The complex lever switch according to claim 14, wherein said at least one arm includes a slit that divides said at least one arm into a first portion and a second portion, with said first and second contacts being positioned at end regions of said first and second portions, respectively.

24. The complex lever switch according to claim 23, wherein said first portion and said second portion of said at least one arm have widths that are different from one another.

25. The complex lever switch according to claim 23, wherein said first portion and said second portion of said at least one arm have heights that are different from one another.

26. The complex lever switch according to claim 14, wherein said at least one arm is divided along the longitudinal direction thereof to provide a first portion and a second portion having different lengths relative to each another, and wherein said first contact is positioned along a longitudinal direction of said at least one arm a distance that is different from a distance that said second contact is positioned along the longitudinal direction of said at least one arm by having said first contact be positioned on an end region of said first portion and said second contact be positioned on an end region of said second portion.

\* \* \* \* \*